(12) United States Patent
Wang

(10) Patent No.: US 11,328,027 B1
(45) Date of Patent: May 10, 2022

(54) CONTENT SERVING METHOD AND SYSTEM

(71) Applicant: Rhizomenet Pty. Ltd., Melbourne (AU)

(72) Inventor: Yue Wang, Melbourne (AU)

(73) Assignee: Rhizomenet Pty. Ltd., Melbourne (AU)

( * ) Notice: Subject to any disclaimer, the term of this patent is extended or adjusted under 35 U.S.C. 154(b) by 0 days.

(21) Appl. No.: 17/206,600

(22) Filed: Mar. 19, 2021

(51) Int. Cl.
*G06V 20/00* (2022.01)
*G06F 16/953* (2019.01)
*G06K 7/14* (2006.01)
*H04L 67/52* (2022.01)
*H04L 67/10* (2022.01)
*G06V 20/10* (2022.01)

(52) U.S. Cl.
CPC ......... *G06F 16/953* (2019.01); *G06K 7/1417* (2013.01); *G06V 20/10* (2022.01); *H04L 67/10* (2013.01); *H04L 67/18* (2013.01)

(58) Field of Classification Search
None
See application file for complete search history.

(56) References Cited

U.S. PATENT DOCUMENTS

| | | | |
|---|---|---|---|
| 10,820,144 B1 | 10/2020 | Wang | |
| 2011/0307931 A1* | 12/2011 | Shuster | G06F 16/78 725/105 |
| 2012/0270563 A1* | 10/2012 | Sayed | H04L 63/083 455/456.3 |
| 2016/0217543 A1* | 7/2016 | Chao | G06Q 30/00 |
| 2018/0089898 A1* | 3/2018 | Huddy | H04W 4/02 |

* cited by examiner

*Primary Examiner* — Tuankhanh D Phan

(57) ABSTRACT

A method comprises: obtaining content, a content location search term, and an image trigger; submitting the content location search term to a web mapping service so that a service API searches with the content location search term; receiving content locations corresponding to the content; adding the content, image trigger, and content locations to a distribution database that is searchable by location; receiving from a consumer device a location of the consumer device; searching the database using the location of the consumer device to identify any content having content locations that correspond to the consumer device's location, and obtaining the associated image trigger(s); performing an image recognition process on image data captured by the consumer device to identify the presence of the or each said associated image trigger in the image data; and if the presence of any of the image triggers is detected, serving the content to the consumer device.

18 Claims, 3 Drawing Sheets

CONTENT SERVING METHOD AND SYSTEM

TECHNICAL FIELD

The present invention relates to a method of distributing contents over a content distribution system. In particular, the invention relates to such a method for distributing contents that are displayable on consumer devices present at associated locations, in response to the capture of an image comprising an associated image trigger.

BACKGROUND

Quick Response (QR) codes are a well-known example of an optically machine readable code. QR codes are often positioned in public places, for example at restaurants or tourism sites, as a means to quickly deliver content to a consumer's mobile device.

Conventional scannable codes such as QR codes have a number of drawbacks however. In particular, QR codes are generic in appearance, and the ways in which they can be customised for aesthetic, marketing, or other purposes while preserving functionality are severely limited.

It is therefore desirable to achieve the functionality of QR codes using images of a user's choice, for example an image of a product, or images associated with a marketing campaign.

SUMMARY

We describe herein a method of serving contents to consumer devices at specific locations, using image recognition of user-generated trigger images.

Replacing highly standardised QR codes with freely chosen images presents significant technical challenges, in particular with respect to scalability. As more contents are added to the system, the computational task of matching an image to its corresponding content becomes more demanding and time consuming.

The present method solves this technical problem by limiting the size of the search space based on both consumer and content location, resulting in significant improvements in search speed as well as accuracy.

According to a first aspect of the present disclosure, there is provided a computer-implemented method of distributing contents over a content distribution system that are displayable on consumer devices present at associated locations. The method comprises: (a) for each item of content of a set of contents, obtaining the content or a first content identifier and a content location search term, and additionally an image trigger; submitting the content location search term to a web mapping service so that a service application programming interface (API) searches with the content location search term; receiving a result list including a plurality of content locations corresponding to the content or first content identifier; and adding the content or first content identifier, the image trigger, and the plurality of content locations in association, to a distribution database or set of linked databases that is or are searchable by location; (b) receiving from a consumer device a first consumer update request including a location of the consumer device; (c) searching the distribution database or the set of linked databases using the location of the consumer device to identify any content or first content identifiers having content locations that correspond to the consumer device's location, and obtaining the associated image trigger or triggers; (d) performing an image recognition process on image data captured by the consumer device to identify the presence of the or each said associated image trigger in the image data; and (e) if the presence of any of the image triggers is detected, serving the content or first content identifier to the consumer device.

In an embodiment, a content location is identified as corresponding to the consumer device's location when the content location and consumer device location are within a predefined distance of each other.

In an embodiment, the consumer device's location comprises a location range, and a content location is identified as corresponding to the consumer device's location when the content location is within said range.

In an embodiment, the content location comprises a location range, and a content location is identified as corresponding to the consumer device's location when the consumer device's location is within said range.

In an embodiment, for a subset of the image triggers having a stationary geographic location, the content location range is a first predefined detection range, and for a subset of the image triggers having a non-stationary geographic location, the content location range is a second predefined detection range, the second predefined detection range being greater than the first predefined range.

In an embodiment, the first predefined detection range is defined by a radius of approximately 50 m.

In an embodiment, the second predefined detection range is defined by a radius of approximately 30 km or more.

In an embodiment, steps (a), (b), (c), and (e) are carried out at a server or cloud server.

In an embodiment, the method further comprises sending, by the server or cloud server, the obtained associated image trigger(s) to the consumer device, for step (d) to be carried out at the consumer device.

In an embodiment, the first consumer update request further comprises the image data captured by the consumer device, and step (d) is performed at a server or cloud server.

According to a second aspect of the present disclosure, there is provided a content distribution system. The system is configured to: (a) for each item of content of a set of contents, obtain the content or a first content identifier and a content location search term, and additionally an image trigger; submit the content location search term to a web mapping service so that a service application programming interface (API) searches with the content location search term; receive a result list including a plurality of content locations corresponding to the content or first content identifier; and add the content or first content identifier, the image trigger, and the plurality of content locations in association, to a distribution database or set of linked databases that is or are searchable by location; (b) receive from a consumer device a first consumer update request including a location of the consumer device; (c) search the distribution database or the set of linked databases using the location of the consumer device to identify any content or first content identifiers having content locations that correspond to the consumer device's location, and obtaining the associated image trigger or triggers; (d) perform an image recognition process on image data captured by the consumer device to identify the presence of the or each said associated image trigger in the image data; and (e) if the presence of any of the image triggers is detected, serve the content or first content identifier to the consumer device.

In an embodiment, the content distribution system comprises a server or a cloud server configured to perform steps (a), (b), (c), and (e).

In an embodiment, the server or cloud server is configured to send, by the server or cloud server, the obtained associated image trigger(s) to the consumer device, for step (d) to be carried out at the consumer device.

In an embodiment, the first consumer update request further comprises the image data captured by the consumer device, and the server or cloud server is configured to perform step (d).

In an embodiment, the content distribution system further comprises the consumer device.

In an embodiment, the content distribution system further comprises the web mapping service API.

DETAILED DESCRIPTION

The following disclosure is concerned with a content distribution application or "app", in which contents may be associated with location data and image "tags" or "triggers". In response to capturing an image of an image trigger in a given location, consumers can be served with particular content, which may then be viewed via a consumer device interface.

Figure 1:
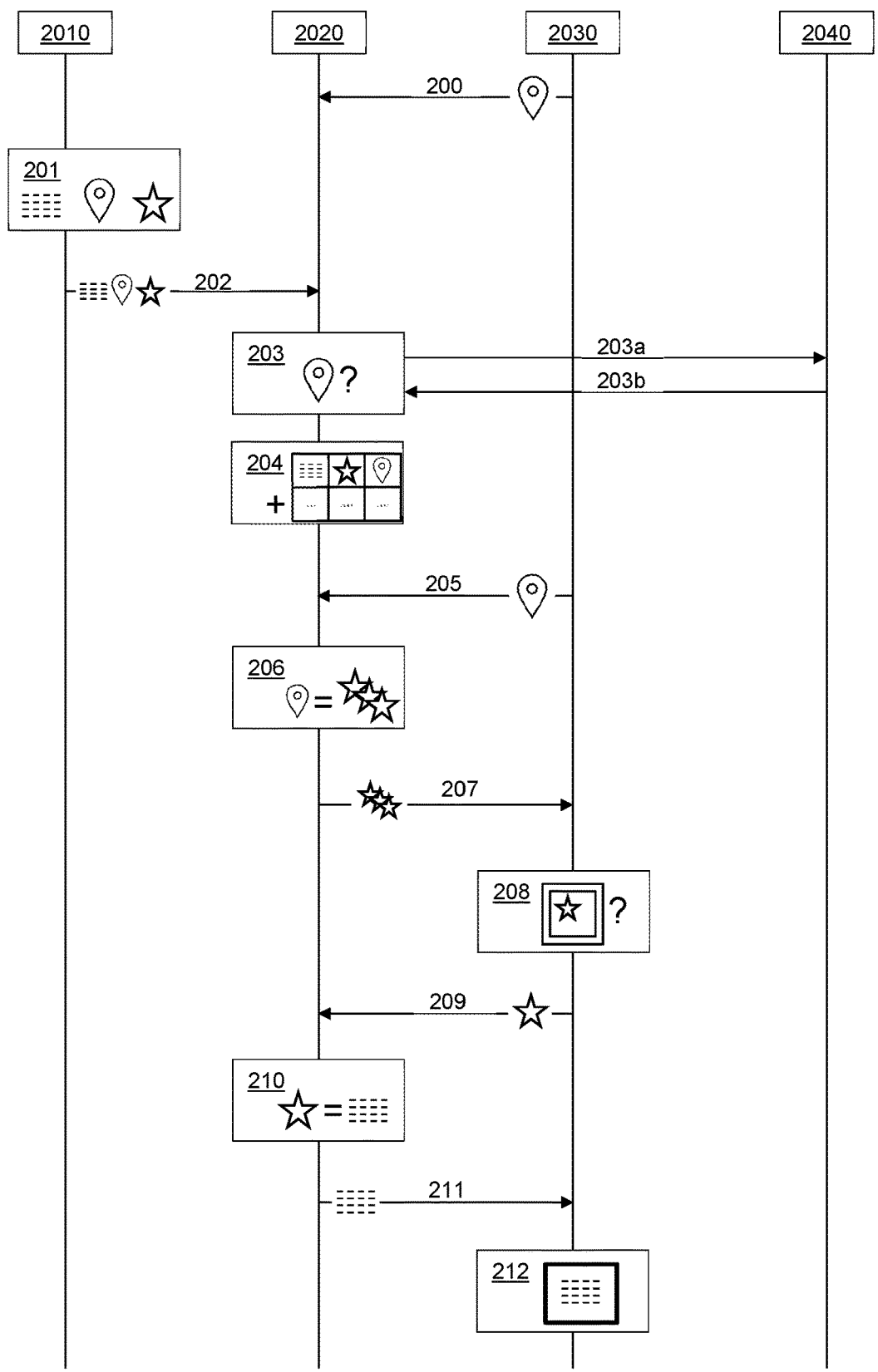
FIG. 1 is a diagram of a content distribution flow in an exemplary method.
Figure 3:
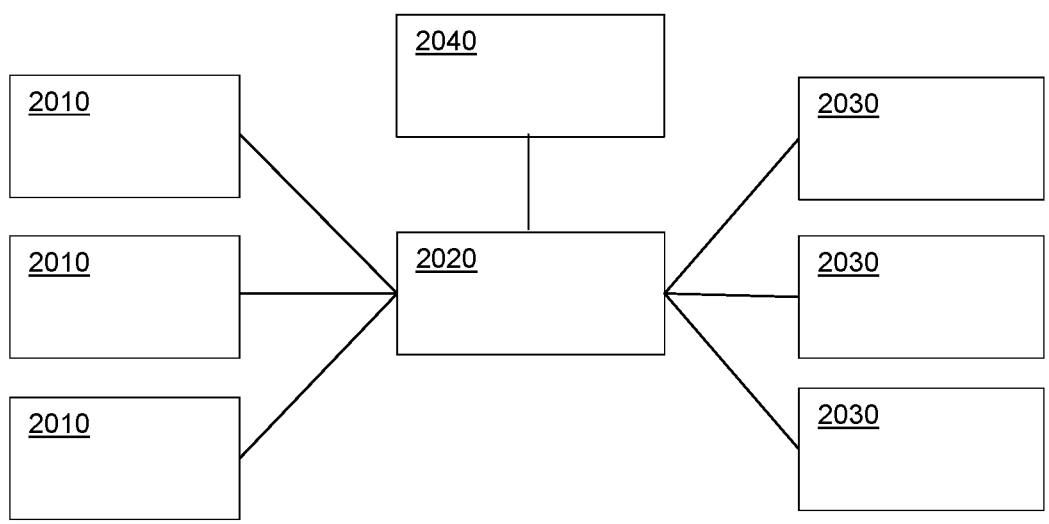
FIG. 3 is a network diagram showing connections between the entities involved in FIGS. 1 and 2.

FIG. 1 illustrates an exemplary content distribution flow according to the present method, whilst FIG. 3 shows an exemplary network on which the method could be implemented.

The network comprises a plurality of sending clients 2010, a server 2020 (which may be a server cluster or server cloud), a plurality of receiving clients 2030, and a web mapping service 2040. The sending client 2010 may also be capable of receiving, and the receiving client 2030 may also be capable of sending—the names simply refer to their roles in the method presented. The clients 2010, 2030 may be smartphones, tablets, PCs, wearables including wrist worn devices, etc. Connectivity between clients 2010, 2030, the server 2020, and the web mapping service 2040 is provided by any suitable communications network(s). For example, the clients 2010, 2030 may be connected to the Internet via cellular or WiFi networks, whilst the server 2020 and mapping service 2040 may be coupled to the Internet via an enterprise network and a broadband network.

Referring again to FIG. 1, in step 200, each receiving client 2030 periodically sends its location to the server 2020. This might result from a user opening the app on his or her device, or selecting a refresh option. Alternatively, the app may provide background updates periodically (for example every 5 or 10 minutes) without requiring specific user input.

In step 201, one of the sending clients 2010 generates contents or a first content identifier to be distributed to intended recipients herein referred to as consumers (the users of the receiving clients 2030 are considered to be consumers of the contents). Businesses may pay a subscription to use this service (via their respective sending clients 2010), or may pay on a per-message basis, or using some other payment model.

Each piece of content or first content identifier is associated with a location search term, and an image trigger [in FIG. 1, contents or first content identifiers are represented by dashed lines, location search terms and locations are represented by location "pin" icons, and image triggers are represented by stars]. In an example, contents or first content identifiers, as well as the associated location search terms and image triggers, may be generated on a separate user device, and uploaded to the sending client device 2010.

Contents may include various multimedia contents, e.g. any combination of text, images, video, audio, live stream or chat, documents, representations of 3D objects, additional location data (i.e. a location other than the associated content location described herein), etc. A suitable first content identifier may comprise for example a URL, or any other data capable of directing a consumer or consumer device 2030 to a piece of content.

Unlike conventional QR codes and other standardised codes, the properties of the image trigger are not particularly limited, provided that it is capable of being correctly and reproducibly identifiable by image recognition when present in a captured image (features such as a clean background, for example, may assist in the image recognition process). This allows sending users free choice to select an image trigger that is distinctive or otherwise suitable for their particular needs. For example, a business may wish to use a company logo or a product as the image trigger. Other public spaces (e.g. galleries, museums, transport hubs, tourist information points etc.) may wish to use images associated with or identifying a specific point of interest or exhibit, for example.

A user associated with the sending client (herein referred to as a "sending user") may choose to distribute the chosen/uploaded image trigger in various ways within a desired geographical area, for example at particular stores, bus stops, or on product packaging, pamphlets etc., as is standard practice with existing QR codes and the like. The present method also allows for sending users to specify image triggers which may already be present at the desired geographic location. For example, a company logo may already be visible in a store window or on items within the store. This reduces the need for dedicated machine readable codes such as QR codes to be physically installed at the location. Unlike QR codes, the image triggers and associated content described herein can therefore be updated quickly and entirely remotely through the network shown in FIG. 3.

The location search term comprises information capable of designating a "content location". The content location may indicate a geographical location of the associated image trigger, or may specify a geographical location from which a consumer device 2030 can access the content upon capturing an image of the trigger (these locations may or may not be equivalent). For the purposes of the present disclosure, unless otherwise stated, the term "location" is considered to refer to both a specific point location, as well as a location range. In particular, the location search term is capable of being searched by a service application programming interface (API), such as the Google™ mapping service API, to identify the content location.

In some examples, the sending user may wish to associate a single piece of content with multiple locations. In this case, the location search term may be capable of defining a multiplicity of locations (e.g. up to 10,000 or more). Consider the example of a chain of supermarkets which wishes to make content available to customers upon the capture of an image of a trigger within any one of the individual stores in the chain. The content might include for example a discount code that a consumer can use to obtain a discount on items purchased (e.g. "Celebrate Valentine's Day; discount code 12345"). The content may then include only static content (i.e. the same for each location of the set), or it may include both static and dynamic content, where the dynamic content depends on which of the set of associated locations corresponds to the consumer device 2030 location. For example, the contents may include a first image which is a product advertisement (static content), and a set of second images which is a picture of the storefronts of the associated locations (dynamic content), defined such that only the picture for the associated location will be sent by the server 2020 to the receiving client 2030. Alternatively, the contents may include text containing both static and dynamic content, e.g. "Come to your local shop at ((address)) for great deals today!", where the data sent to the server 2020 comprises a lookup table of addresses for each of the set of associated locations, and the server 2020 substitutes the relevant address for "((address))" in the contents prior to sending the content to the receiving client 2030.

In step 202, the sending client 2010 sends the content or first content identifier, the location search term, and the image trigger to the server 2020. This may be done using a "business platform" interface or website having a field or fields for each of the content, the location search term, and the image trigger.

In step 203, the server 2020 identifies the content locations associated with the location search term. These might be, for example, the addresses of stores in a chain, their GPS or geographic coordinates, i.e. latitude and longitude, or another suitable representation. The server 2020 may perform this step by submitting (203*a*) the location search term to an appropriate API 2040, such as the Google™ mapping service application programming interface (API), to perform a search using the location search term. The server 2020 then receives (203*b*) a results list including a plurality of content locations.

In step 204, the server 2020 adds the content or first content identifier, the image trigger, and the plurality of content locations to a distribution database or a set of linked databases that is or are searchable by location (collectively referred to herein as an "Atlas database", and depicted in FIG. 1 as a table). As further contents are sent by the same or different sending users, the respective contents, locations and triggers are identified by the server 2020 and the Atlas database updated. The result is an Atlas database containing multiple locations associated with various contents and corresponding triggers. It will be appreciated that the Atlas creation process is dynamic, and that the location of step 204 in the flow is merely exemplary. For example, a local "lightweight" Atlas database may also be installed on the consumer device 2030 to allow for some limited localized mapping and images. This may improve functionality when the consumer device's network connection is poor, for example.

In step 205, the server 2020 receives a further consumer update request including a location of the consumer device from a given receiving client 2030.

In step 206, the server 2020 searches the Atlas database using the location of the consumer device to identify any contents or first content identifiers having content locations that correspond to the consumer device's location, and will obtain the associated image trigger or triggers. Said triggers are then sent to the consumer device 2030 (step 207).

Each trigger sent to the consumer device 2030 may be accompanied by a "second" content identifier [the term "second" in this context merely serves to distinguish the content identifier sent to the consumer device 2030 in step 206, from the "first" content identifier which may be provided by the sending user in steps 201-202]. The second content identifier allows the network to identify contents associated with a detected image trigger, in order to serve said contents to the consumer device 2030. For example, the content identifier may be a unique reference number (URN) for use by the network in conjunction with the Atlas database. It will also be appreciated that, where the sending user provides a first content identifier to be distributed to the consumer devices 2030, the second content identifier may be the same as the first content identifier.

The location of the consumer device 2030 may not necessarily have to correspond exactly to the content location in order for the associated image trigger to be obtained in step 206. In particular, an image trigger may be obtained when the consumer device's location lies within a predetermined detection range of the content location. In one example, each piece of content may have an associated adjustable predetermined detection range. The extent of each detection range is not particularly limited, but may be relatively small (e.g. a 100 m, 50 m, or smaller radius centred on the content location) for "standard" messages. This greatly reduces the number of image triggers in the Atlas database which are required to be searched for matches to an image captured by a consumer device 2030 in a particular location, improving the speed and accuracy of content delivery (particularly as the number of sending users and contents increases over time). To ensure fast and reliable trigger identification and content delivery, the number of image triggers supported by the app may be limited within a given area. For example, for any given area defined by a 50 m radius, the number of supported image triggers may be limited to 25 or less.

Image triggers will often be stationary in space or "static", for example at restaurants, stores, hotels, galleries, museums, etc. However, sending users may also wish to provide "dynamic" image triggers, the locations of which may not be fixed. Dynamic image triggers could be provided on public transport such as trains or buses, on flyers, pamphlets, business cards etc, or even as images on webpages. The present method may be adapted to support the use of such dynamic triggers by expanding the detection range for selected "super-sized" contents. "Super-sized" contents may be associated with much larger detection ranges, for example up to 30 km, allowing them to be served to consumer devices across the whole of a city. This feature may be particularly advantageous for companies having different advertising campaigns from city to city, who can tailor their contents accordingly. Even greater detection ranges may be supported, for example of 50 km, 100 km, 200 km, 300 km, 400 km, 500 km, 600 km, 700 km, 800 km, 900 km, 1000 km, or more, to allow for a piece of "super-sized" content to be served across the largest of cities, regions, or even countries.

A number of "global" pieces of content may also be supported, which are servable to a consumer device 2030 at any location worldwide. Of course, each piece of "super-sized" and "global" content constitutes one of the available image triggers for a given location, therefore their numbers may be restricted (e.g. 100 pieces of "super-sized" content per city, or only 1 to 5 pieces of "global" content may be supported at any time).

The detection range and the maximum number of pieces of content supported within a given radius, as well as the maximum number of pieces of "super-sized" and "global" content, can be increased or decreased depending on various factors, for example improvements in the capabilities of consumer device hardware and mobile networks. The standard detection range may also be adjusted on a region-by-region basis, for example with a greater radius in regions having fewer trigger images and vice versa.

In step 208, the consumer device 2030 performs an image recognition process on image data (depicted in FIG. 1 as a frame) captured by the consumer device 2030, to identify the presence of one or more of the image triggers obtained in step 206.

It will be appreciated that the captured image data may not necessarily need to comprise an exact match to the image trigger supplied in step 201 in order to be recognised as corresponding to said trigger. That is, an image trigger may be identified within a piece of captured image data if a predetermined similarity threshold is exceeded. This allows for a single image trigger to cover various modifications which may be made to the physical trigger at the real-life location. For example, where the image trigger is a company product, a captured image of a product with different colour variations or inverted colours may also be recognised as corresponding to the trigger. Similarly, the similarity threshold may be configured to accommodate for minor feature differences (additions or omissions), making the method robust to the evolution of the physical triggers, for example due to marketing updates or even due to dirt/wear and tear.

If the presence of any of the image triggers is detected, the consumer device 2030 may send the corresponding second content identifier to the server 2020 in step 209, and the method proceeds to step 210. Sending a content identifier (e.g. as opposed to returning the identified image trigger to the server 2020) helps to reduce the bandwidth requirements of the method, improving speed and efficiency. Of course, if the second content identifier corresponds to a first content identifier provided by the user in steps 201-202, the method may proceed directly to step 212.

In step 210, the server 2020 uses the second content identifier received from the receiving client 2030 to retrieve contents or a first content identifier corresponding to the detected trigger image, and sends the content or the first content identifier to the consumer device 2030 (step 211).

In step 212, the content or first content identifier may be displayed by the consumer device 2023.

Content may be displayed at the consumer device 2030 in a number of ways, depending upon factors such as the nature of the consumer device 2030, and the format of the message content. In one example, the message content is displayed by augmented reality (AR) display. An AR display is one which overlays display graphics on a real world environment. There are broadly two types of augmented reality displays. In the first type, display graphics are overlaid on an image (generally a live image) taken from a camera. This is the type commonly seen on AR apps for smartphones. In the second type, graphics are displayed on a transparent or translucent display, which the user can look through to see the real world beyond. This type is used for AR headsets, "smart glasses", or "smart windows", and has been proposed for "smart contact lenses". The above disclosure could apply to any of the AR examples given, and will also be applicable to future AR technologies with appropriate modification including holographic displays.

In one example, a content notification may be displayed by the consumer device 2030, awaiting input from the consumer to display the content. Content may also be associated with a passcode, such as a password or PIN code, such the content can only be viewed or accessed after a receiver has entered the passcode into his or her device. The passcode may be derived from biometric data such as a fingerprint or the image of a face. In the case of a password, the user's device may provide a means for recovering a forgotten password, such as by way of displaying a password hint.

It will be appreciated that the receiving client 2030 may or may not be the same device on which the contents may ultimately be displayed. For example, a consumer may have multiple consumer devices which are "paired", for example a smart-phone in communication with a smart-watch (or other smart-accessory such as glasses or contact lenses) via Bluetooth. A first consumer device (e.g. the smart-phone) may carry out one or more of the method steps of the receiving client 2030 as described herein (e.g. providing consumer update requests to the sever 2020 (steps 200, 205), receiving image triggers or contents from the server (steps 207, 211), performing image recognition (step 208), or sending second content identifiers to the server 2020 (step 209). Meanwhile, a second consumer device (e.g. the smart-watch) may perform any remaining method steps, or may simply function as a consumer interface and display for contents served to the first consumer device.

The skilled person will appreciate that a number of modifications may be made to the method as described herein.

Figure 2:
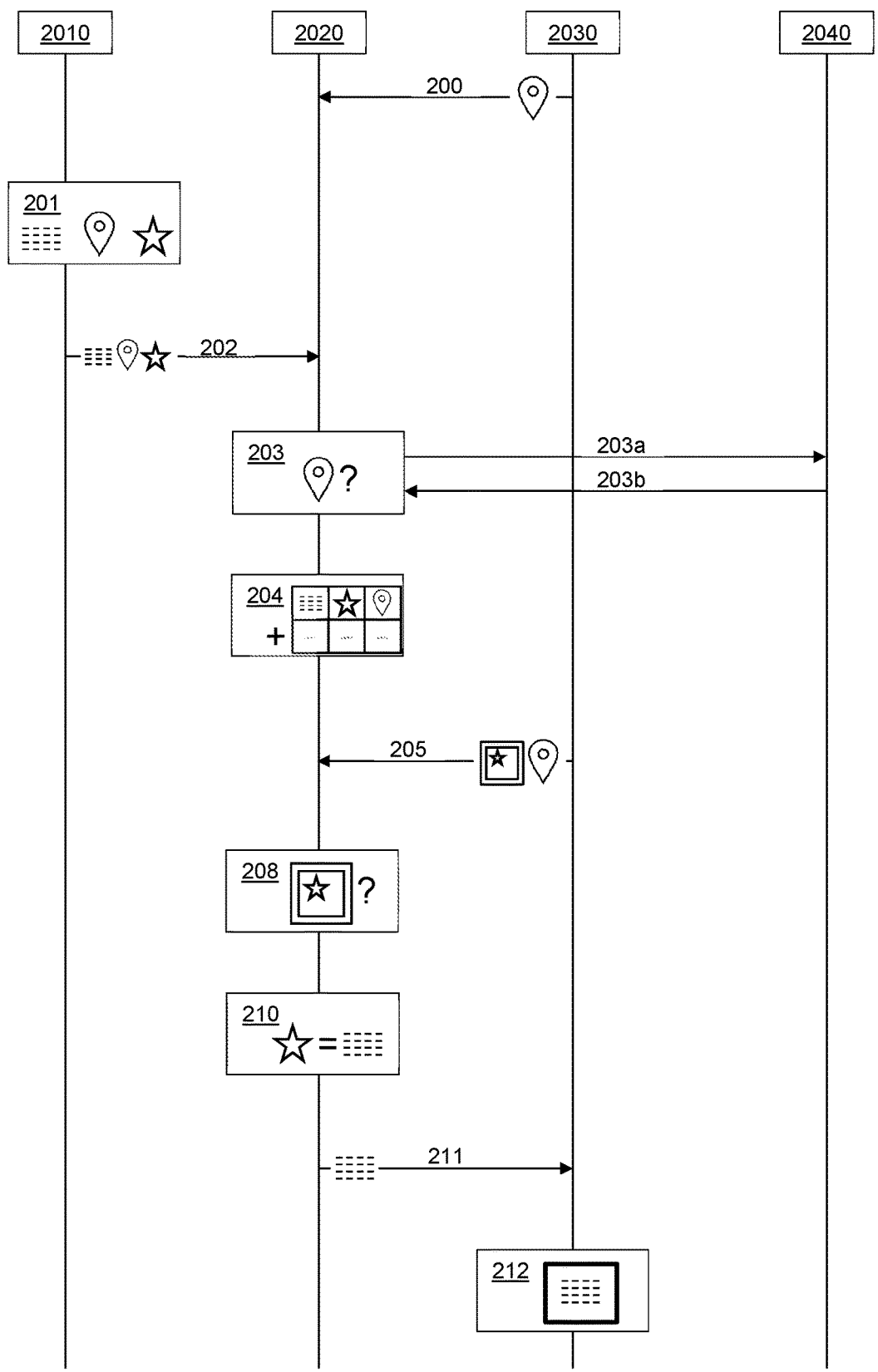
FIG. 2 is a diagram of a content distribution flow in an alternative exemplary method.

For example, FIG. 2 illustrates an alternative content distribution flow, wherein the further consumer update request sent in step 205 includes image data captured by the consumer device. The image recognition step 208 is then carried out at the server or cloud server 2020, before proceeding to step 210 as described above.

While the above examples have referred to a "sending client" and a "server", the messages may be directly created at the server 2020, rather than being originally obtained from a sending client 2010. For example, this may occur in a setup where an advertiser instructs the operator of the server 2020 to generate a message on their behalf.

The methods described herein may also employ additional techniques to further reduce the number of image triggers which need to be searched for matches to a captured image for a given consumer device location. For example, many mobile devices such as smartphones now possess Light Detection and Ranging (LiDAR) or other range determining functionality. Such functionality may be used to map the space around the consumer device 2030, allowing for the search to be narrowed to a much smaller range, for example of 5-50 mm, drastically reducing the number of image triggers to be searched in the image recognition process. In an example, content stored in the Atlas database may be associated with a model of an environment. The "environment" may comprise a space (e.g. a room) or an object (e.g. a sculpture at a museum). The "model" may be data comprising a scanned three-dimensional (3D) model of the environment, for example obtained by LiDAR or other depth sensing hardware, and may be provided to the network by the sending user in step 201 for example. A consumer device may then scan the environment (or a portion thereof) while at the physical location, and the resulting scan data can be used to identify corresponding content with high spatial resolution and accuracy. The scan data may, for example, be sent to the server 2020 (e.g. with the consumer device location in step 205). The server 2020 can then use model matching between the consumer device's scan data and the model stored in the Atlas database, to further refine the number of search results returned in step 206, beyond the selection achieved on the basis of consumer device location alone. This also allows user generated content to be displayed in situ at precisely defined locations, for example within millimeter accuracy of where the sending user desires. This may be particularly advantageous when a number of image triggers are distributed in close proximity, for example in a single room, and may be especially effective when content is displayed to the user using AR as described herein.

It will be further appreciated that image data captured by a consumer device may be processed to identify the presence of multiple image triggers in the image data and to subsequently serve to the device or an associated device respective content. The content may be delivered in parallel or sequentially.

The method described here may be integrated into a message content delivery service such as that described in U.S. Ser. No. 10/820,144B1. Various features, such as the Atlas database may be common to the message content delivery service and the content delivery service described above.

The invention claimed is:

1. A computer-implemented method of distributing contents over a content distribution system, the contents including digital media and being displayable on receiving client devices present at associated locations, and the method comprising steps including:
   (a) for each item of content of a set of contents,
       receiving, from a sending client device, the content or a first content identifier, a content location search term, and an image trigger;
       submitting the content location search term to a web mapping service so that a service application programming interface (API) searches with the content location search term and identifies a plurality of content locations associated with the content location search term;
       receiving a result list including the plurality of content locations; and
       adding the content or the first content identifier, the image trigger, and the plurality of content locations in association, to one or more distribution databases that are searchable by locations;
   (b) receiving from a receiving client device a first consumer update request including a location of the receiving client device;
   (c) searching the one or more distribution databases using the location of the receiving client device to identify content, or a first content identifier, having a content location that corresponds to the location of the receiving client device, and obtaining at least one image trigger associated with the identified content or first content identifier;
   (d) performing, using the at least one image trigger, an image recognition process on image data captured by the receiving client device to detect presence of the at least one image trigger associated with the identified content or first content identifier in the captured image data; and
   (e) in response to that the presence of the at least one image trigger associated with the identified content or first content identifier is detected, serving the content, or content identified by the first content identifier, associated with the at least one image trigger to the receiving client device by automatically displaying the content, or the content identified by the first content identifier, associated with the at least one image trigger on the receiving client device.

2. The method of claim 1, wherein a content location is identified as corresponding to the location of the receiving client device when the content location and the location of the receiving client device are within a predefined distance of each other.

3. The method of claim 1, wherein the location of the receiving client device comprises a location range, and a content location is identified as corresponding to the location of the receiving client device when the content location is within the location range.

4. The method of claim 1, wherein each of the content locations comprises a content location range, and a content location is identified as corresponding to the location of the receiving client device when the location of the receiving client device is within the content location range.

5. The method of claim 4, wherein
   for a subset of image triggers having stationary geographic locations, the content location range is a first predefined detection range, and
   for a subset of image triggers having non-stationary geographic locations, the content location range is a second predefined detection range,
   the second predefined detection range being greater than the first predefined range.

6. The method of claim 5, wherein the first predefined detection range is defined by a radius of approximately 50 m or less.

7. The method of claim 5, wherein the second predefined detection range is defined by a radius of approximately 30 km or more.

8. The method of claim 1, wherein the steps (a), (b), (c), and (e) are executed at a server or a cloud server.

9. The method of claim 8, further comprising sending, by the server or the cloud server, the obtained at least one image trigger associated with the identified content or first content identifier to the receiving client, for the step (d) to be executed at the receiving client device.

10. The method of claim 8, wherein the first consumer update request further comprises the image data captured by the receiving client device, and the step (d) is performed at the server or the cloud server.

11. A content distribution system comprising a memory and one or more processors, wherein the one or more processors are configured to execute computer instructions stored in the memory to perform steps comprising:
   (a) for each item of content of a set of contents including digital media and being displayable,
       receiving, from a sending client device, the content or a first content identifier, a content location search term, and an image trigger;
       submitting the content location search term to a web mapping service so that a service application programming interface (API) searches with the content location search term and identifies a plurality of content locations associated with the content location search term;
       receiving a result list including the plurality of content locations; and
       adding the content or the first content identifier, the image trigger, and the plurality of content locations in association, to one or more distribution databases that are searchable by locations;
   (b) receiving from a receiving client device a first consumer update request including a location of the receiving client device;
   (c) searching the one or more distribution databases using the location of the receiving client device to identify content, or a first content identifier, having a content location that corresponds to the location of the receiving client device, and obtaining at least one image trigger associated with the identified content or first content identifier;

(d) performing, using the at least one image trigger, an image recognition process on image data captured by the receiving client device to detect presence of the at least one image trigger associated with the identified content or first content identifier in the captured image data; and (e) in response to that the presence of the at least one image trigger associated with the identified content or first content identifier is detected, serving the content, or content identified by the first content identifier, associated with the at least one image trigger to the receiving client device by automatically displaying the content, or the content identified by the first content identifier, associated with the at least one image trigger on the receiving client device.

12. The content distribution system of claim 11, wherein the one or more processors are of a server or a cloud server configured to perform the steps (a), (b), (c), and (e).

13. The content distribution system of claim 12, wherein the server or the cloud server is configured to send the obtained at least one image trigger associated with the identified content or first content identifier to the receiving client device, for the step (d) to be executed at the receiving client device.

14. The content distribution system of claim 12, wherein the first consumer update request further comprises the image data captured by the receiving client device, and the server or the cloud server is configured to perform the step (d).

15. The content distribution system of claim 11, further comprising the receiving client device.

16. The content distribution system of claim 11, further comprising the web mapping service API.

17. The method of claim 1, wherein the one or more distribution databases are linked databases.

18. The content distribution system of claim 11, wherein the one or more distribution databases are linked databases.

* * * * *